May 11, 1926.
T. W. MILLER
1,584,465
APPARATUS FOR VULCANIZING RUBBER ARTICLES
Filed May 14, 1920
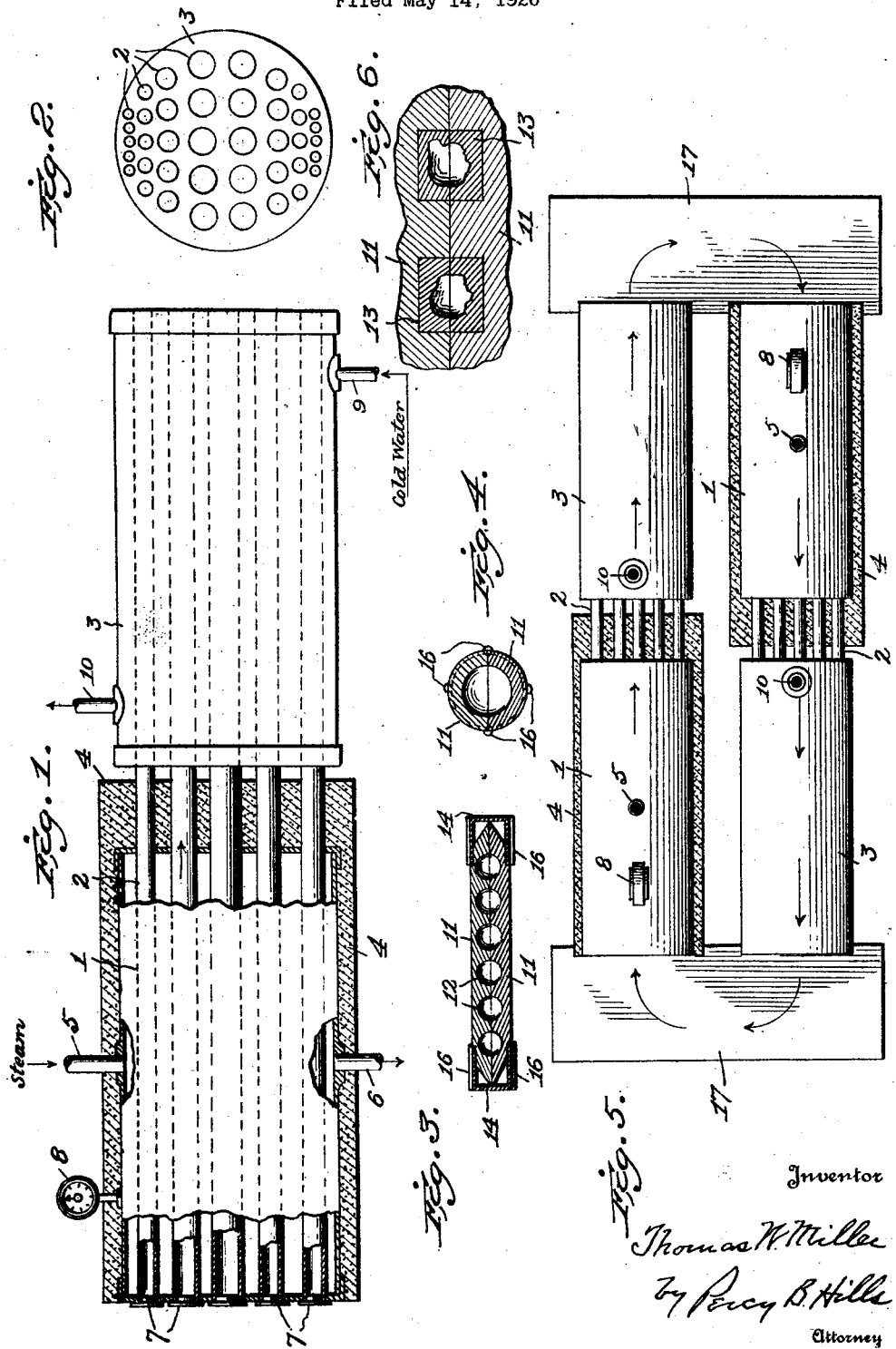
Inventor
Thomas W. Miller
by Percy B. Hills
Attorney Patented May 11, 1926.

1,584,465

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

APPARATUS FOR VULCANIZING RUBBER ARTICLES.

Application filed May 14, 1920. Serial No. 381,270.

My invention relates to apparatus for vulcanizing rubber articles, and is particularly adapted for use in the treatment of hollow rubber articles, such as balls, bulbs, toys, and the like, which are expanded to shape in molds by internal pressure, and has for its primary object materially to reduce the labor in treating the articles, as well as to accomplish the desired vulcanization with a minimum expenditure of heat. A further object of my invention is to provide for subjecting the articles in one continuous operation successively to the vulcanizing heat and to the action of a cooling medium, the articles being moved through the apparatus step by step, and receiving said movement through the insertion into the apparatus of successive articles to be treated. A still further object of my invention is so to arrange the vulcanizing apparatus that the article bearing appliances emerging from one unit of the apparatus may be returned, for re-use in that unit, actively, through another and similar unit after having been recharged.

These objects I accomplish in the manner and by the means hereinafter described and climed, reference being had to the accompanying drawing, in which:—

Figure 1 is a side elevation of a vulcanizing and cooling unit embodying my improved construction, the heating or vulcanizing chamber being partly in section.

Figure 2 is an end view of the cooling chamber.

Figure 3 is an enlarged sectional view of one of the cartridge molds for containing the articles to be vulcanized during their passage through the apparatus.

Figure 4 is a transverse sectional view of said cartridge mold.

Figure 5 is a top plan view of my improved apparatus complete.

Figure 6 is a detail vertical sectional view of a modified construction of the cartridge mold.

Similar numerals of reference denote corresponding parts in the several views.

In the said drawing, the reference numeral 1 denotes a steam chamber or vulcanizer, the same being provided with a plurality of conduits or tubes 2 passing horizontally therethrough, said tubes extending through a cooling chamber 3, the latter being placed end to end with the chamber 1 and spaced a slight distance from the same. I prefer to surround the chamber 1 with a jacket 4 of asbestos or other heat non-conducting material, said jacket enveloping the tubes at the discharge end of said chamber and between the same and the chamber 3, as shown. The chamber 1 is provided with the usual steam inlet pipe 5, and with a discharge pipe 6 at the bottom, which latter may be provided with a conventional trap for retaining the steam and yet permitting the discharge of the water of condensation. At the entrance ends of the tubes 2 I provide a series of closing plugs 7, though the same may be in the shape of swinging gates, it being necessary only that some suitable means be provided for closing said openings normally to prevent the egress of heat. I also provide the chamber 1 with a suitable gage 8 to indicate the temperature or pressure within the same.

The cooling chamber 3 is provided with a water inlet pipe 9 at the bottom and with a water discharge pipe 10 at the top, as shown. The cartridge molds for containing the articles to be vulcanized are shown in Figures 3 and 4, and comprise each complementary members 11 semi-circular in exterior cross area and provided on their registering faces with a plurality of mold chambers 12 adapted to register with each other. In the construction shown in Figures 3 and 4, these mold chambers are shaped to form rubber balls, though if desired, they may be formed into chambers adapted to receive removable and interchangeable molds 13, as shown in Figure 6, said molds being interiorly shaped in any desired manner to form suitable articles. The mold sections 12 are retained together by end-caps 14 slipped thereon, said caps preferably being formed with a series of longitudinal ribs 16 adapted to fit snugly the interior of the tubes 2, which in size correspond therewith, so that they may slide freely through said tubes.

The balls, toys, or other articles to be formed are expanded into shape in their molds by internal pressure, in a manner well known in the art, and in carrying out my improved process, one of the mold sections 11 has its mold cavities filled with the articles to be expanded, and the other section placed thereon the two being fastened in position by applying the end-caps 14. Steam having been admitted to the chamber 1, and the desired temperature obtained therein, as readily can be determined from the gage 8, the plug 7 of one of the tubes of a size adapted to receive the particular cartridge mold is removed and the cartridge mold inserted. In the meantime other cartridge molds of the same size are charged, and at suitable intervals successive cartridge molds are inserted into the said tube, the insertion of each mold automatically forcing the preceding mold or molds forward through the tube. By timing the passage of the molds through the tube in this manner, they may be subjected to the desired vulcanizing heat and may be discharged from the chamber 1 at the proper time. The continued insertion of the molds force the preceding molds forwardly through the tube 2 and into and through the cooling chamber 3 where said molds are subjected to the action of a cooling medium, preferably cold water, and are discharged from said chamber 3 in a properly cooled condition, as readily will be understood.

In Figure 5 I have shown an assembly of two vulcanizing and cooling units, there being provided at each end a suitable table 17 for the convenience of the operators. With this arrangement the molds may be fed into the chamber 1 from the left and discharged upon the table 17 at the right, and there may be emptied and refilled and then fed into the other vulcanizing chamber 1 at the right, to be discharged upon the table 17 at the left, thus reducing to a minimum the handling of the molds.

I prefer to support the chambers 1 and 3 at a slight angle from the horizontal, the pitch being downward from the feeding toward the discharge end of the units, in order to facilitate the passage therethrough of the molds.

As seen in Figures 1 and 2, I contemplate the employment of tubes 2 of varying sizes in a single unit in order to accommodate molds of corresponding sizes for articles of different characters, thus adapting the apparatus to the treatment of articles of different sizes. While I have shown a limited number of tubes in the vulcanizing and cooling chambers, it will be understood that the number may be increased or diminished at will, the only requirement being that there be a free circulation of steam and water around said tubes in order properly to treat the articles being molded.

While I have shown the longitudinal ribs 16 on the caps 14 of the cartridge molds, it will be understood that these ribs 16 may be formed on the sections 11 of the molds instead of on the caps, it being desirable only that there be such ribs on one part or other to reduce the friction to a minimum.

An important result obtained by my improved apparatus is that there is no necessity for a periodic discharge of the steam from the vulcanizing chamber 1, as is the case with apparatus of this character heretofore in use, where it is necessary to open said chamber each time that it is charged with articles to be vulcanized. By employing the tubes 2 as receivers for the molds, said tubes being sealed against ingress of the steam and water in the chambers 1 and 3, the temperature in chamber 1 may be kept constant at the proper vulcanizing heat and the operation of the apparatus be continued indefinitely without interruption, thus not only insuring more uniform results, but also effecting a very material saving in heat units. Time also is saved, due to dispensing with the necessity for reheating the vulcanizer every time a fresh charge is introduced therein, as in apparatus heretofore in use.

Having thus fully described my invention, what I claim as new and desire to secure by Letters Patent, is:—

1. A cartridge mold, for use in a continuous vulcanization process, comprising complementary sections formed to provide a cavity for the article to be vulcanized, and annular caps formed to surround the ends of said sections to hold said sections assembled.

2. A cartridge mold, for use in a continuous vulcanization process, comprising complementary sections formed to provide a plurality of cavities each arranged to receive an article to be vulcanized, and annular caps formed to surround the ends of said sections to hold said sections assembled.

3. An apparatus for vulcanizing rubber articles, comprising a heating chamber, a conduit passing therethrough and sealed therefrom, and a series of cartridge molds for containing the articles to be vulcanized adapted to be inserted successively into said conduit, each mold by its insertion automatically forcing forward the preceding mold, said molds being provided with longitudinal ribs for engaging the interior of said conduit to space said mold therefrom and to reduce friction.

4. A cartridge mold, comprising two separable semi-cylindrical sections formed in their adjacent faces into registering semi-mold chambers, and cylindrical caps fitting the ends of said sections detachably to retain the same together.

5. A cartridge mold, comprising two separable sections formed in their adjacent faces into registering semi-mold chambers and means for detachably retaining the same together, and ribs formed longitudinally thereon.

6. A cartridge mold, comprising two separable sections formed in their adjacent faces into registering semi-mold chambers, caps fitting the ends of said sections detachably to retain the same together, and ribs formed longitudinally on said caps.

In testimony whereof, I hereunto affix my signature.

THOMAS W. MILLER.